United States Patent
Chang et al.

(10) Patent No.: US 6,373,725 B1
(45) Date of Patent: Apr. 16, 2002

(54) RECONFIGURABLE CONVERTER FOR MULTIPLE-LEVEL INPUT-LINE VOLTAGES

(75) Inventors: Chin Chang, Yorktown Heights, NY (US); Adan Hernandez, Naperville, IL (US); Gert Bruning, Sleepy Hollow, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/716,698

(22) Filed: Nov. 20, 2000

(51) Int. Cl.$^7$ .............................................. H02M 3/335
(52) U.S. Cl. ...................... 363/21.01; 323/222; 323/284
(58) Field of Search .................................. 323/222, 282, 323/284; 363/20, 21.01, 21.04, 21.12

(56) References Cited

U.S. PATENT DOCUMENTS

| | | | |
|---|---|---|---|
| 4,549,254 A | * 10/1985 | Kissel | 363/21 |
| 5,146,399 A | 9/1992 | Gucyski | 363/89 |
| 5,570,276 A | 10/1996 | Cuk et al. | 363/16 |
| 5,617,015 A | 4/1997 | Goder et al. | 323/282 |
| 5,786,990 A | 7/1998 | Marrero | 363/16 |
| 5,894,214 A | * 4/1999 | Jiang | 323/222 |
| 5,991,166 A | 11/1999 | Kalfhaus | 363/16 |
| 5,999,419 A | * 12/1999 | Marrero | 363/21 |
| 6,144,565 A | * 11/2000 | Lethellier | 323/222 |
| 6,175,219 B1 | * 1/2001 | Imamura et al. | 323/222 |

* cited by examiner

Primary Examiner—Jeffrey Sterrett

(57) ABSTRACT

A switchable power converter includes an input section that receives an AC input voltage and rectifies the AC input voltage and a switchable converter section operative to receive the rectified AC input voltage and convert the rectified AC input voltage to an intermediate DC output voltage. The switchable converter section includes at least one configuration switch operative to switch the switchable converter section between a boost converter topology, for low input line voltages, and either a flyback or SEPIC converter circuit topology, for high input line voltages.

20 Claims, 10 Drawing Sheets

RECONFIGURABLE CONVERTER FOR MULTIPLE-LEVEL INPUT-LINE VOLTAGES

BACKGROUND OF THE INVENTION

1. Field of the Invention

The present invention relates generally to power converters, and more particularly to switchable power converters for multiple level input line power factor correction.

2. Background of the Invention

FIG. 1 illustrates a conventional power converter circuit operating as a high frequency electronic ballast for multiple gas discharge lamps 190. Referring to FIG. 1, the power converter circuit basically comprises two stages. The front end is a boost converter 100 for universal line power factor correction and universal line voltage regulation. The boost converter 100 is primarily comprised of a power switch 102, inductor 104, diode 106, and DC bus capacitor 108.

The back end is a typical voltage-fed half-bridge inverter 140 loaded with the lamps 190 through a resonant tank circuit comprised of a capacitor 152 and inductor 154, along with any magnetizing inductance generated by output transformer 156. The half-bridge inverter is primarily comprised of power switches 148 and 150.

The boost converter of FIG. 1 is ideal for providing a DC bus voltage 112 of 450 VDC (across capacitor 108) for input voltages of 120V/277V AC. The relatively high DC output voltage level is due to the fact that the intrinsic topology of the boost converter requires the DC bus voltage 112 to be greater than the peak value of the input line voltage.

However, some applications require a lower DC bus voltage, for example 225V DC. In those applications a flyback converter is better suited, since the flyback converter is capable of generating the relatively low DC bus voltage of 225V DC from an input voltage of 120V/277VAC. The flyback converter, however, has several drawbacks, including higher component stresses, lower overall efficiency, larger component sizes, and severely large electromagnetic interference (EMI) conditions.

Alternatively, a single-ended primary inductance converter (SEPIC) may be employed. The SEPIC is capable of producing an intermediate DC output voltage, such as 225V DC. While the SEPIC shares some of the drawbacks of the flyback converter, such as higher component stress, lower overall efficiency and larger size, the SEPIC enjoys improved EMI conditions. This is because the SEPIC input section is similar to the boost converter input section.

It is a characteristic of both the flyback and SEPIC converters that the highest losses occur at the lowest input line voltage and the highest voltage stresses occur at the highest input line voltage over a universal input line voltage range. Among the flyback, SEPIC and boost converters, the boost converter exhibits the highest efficiency and lowest voltage stresses. However, as discussed above, the boost converter is only viable for use at lower input line voltages in the case of 225V DC bus voltage specifications.

A switchable power converter is therefore needed that advantageously switches between a boost converter circuit topology, for low input line voltages, and either a flyback or SEPIC converter circuit topology, for high input line voltages, to provide an intermediate DC output voltage level, such as 225V DC, over a range of input line voltage levels.

SUMMARY OF THE INVENTION

It is therefore an object of the present invention to provide a switchable power converter.

It is another object of the present invention to provide a switchable power converter having improved efficiency and reduced stresses over a range of input line voltages.

To achieve the above objects, a switchable power converter in accordance with the present invention includes an input section that receives an AC input voltage and rectifies the AC input voltage and a switchable converter section operative to receive the rectified AC input voltage and convert the rectified AC input voltage to an intermediate DC output voltage. The switchable converter section includes at least one configuration switch operative to switch the switchable converter section between a boost converter topology, for low input line voltages, and either a flyback or SEPIC converter circuit topology, for high input line voltages. The configuration switch may be a relay based mechanical switch or a solid state switch, for example.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION OF THE PREFERRED EMBODIMENTS

Figure 1:
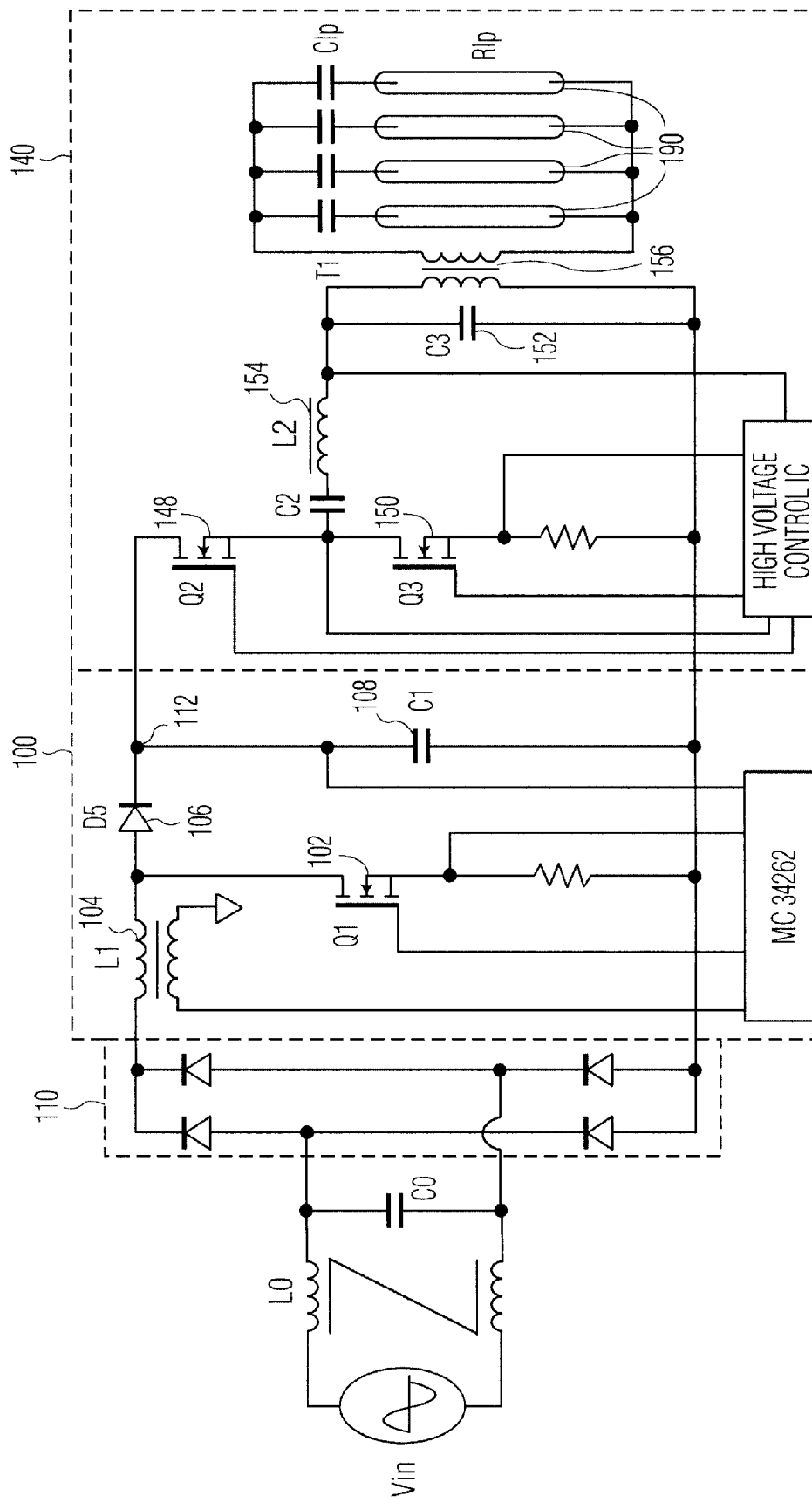
FIG. 1 is a schematic diagram illustrating a conventional boost converter application.

Preferred embodiments of the present invention will be described hereinbelow with reference to the accompanying drawings. In the following description, well-known functions or constructions are not described in detail to avoid obscuring the invention with unnecessary detail.

Turning again to the drawings, in which like reference numerals identify similar or identical elements throughout the several views, FIG. 2 illustrates an exemplary circuit topology for a switchable boost/SEPIC converter in accordance with the present invention.

Referring to FIG. 2, when a switch 200 is conductive (closed) in position A, the switchable boost/SEPIC converter is configured as a boost converter topology. In this configuration, the boost converter is comprised primarily of power switch 202, inductor 204 and diode 206. When switch 200 is conductive in position B, a SEPIC converter topology is formed comprised primarily of power switch 202, coupled inductors 204 and 208, capacitor 210 and diode 206.

Referring to FIG. 3, a switchable boost/isolated SEPIC converter is shown. Here, when switch 300 is conductive and switch 301 is not conductive (open), a boost converter topology is formed comprised primarily of power switch 302, inductor 304, and diode 306. When switch 300 is not conductive and switch 301 is conductive, an isolated SEPIC converter topology is formed comprised primarily of power switch 302, inductors 304 and 308 coupled together and also coupled to isolation transformer 312, capacitor 310, and diode 306. Here, inductor 308 may be omitted and replaced by the magnetizing inductance of the isolation transformer 312. As can be appreciated, the circuits of FIGS. 2 and 3 are similar, with the circuit of FIG. 3 providing isolation from the load R0 in the SEPIC configuration via isolation transformer 312.

As discussed above, it is advantageous to configure the circuits of FIGS. 2 and 3 to operate in a boost topology when the input line voltage is approximately 120V AC, since the boost converter provides greater circuit efficiency. However, due to the intrinsic output voltage limitations of the boost converter, a SEPIC converter topology is preferable when the input voltage is approximately 277V AC, in order to obtain a medium output voltage that is lower than the peak input voltage, such as 225V DC.

There are notable practical circuit design considerations when implementing a switchable power converter. First, the power factor correction (PFC) control 225, 325 must be capable of achieving power factor correction for both the boost and SEPIC topologies. The PFC control IC preferably operates each converter in the critical conduction mode. The critical conduction mode is at the boundary between the continuous conduction mode and the discontinuous conduction mode. The operating frequency may vary over each input line voltage cycle. The power switch 202, 302 is switched at the instant the drain-source voltage waveform passes through zero (ZVS condition), thereby minimizing RF interference. One example of a suitable PFC control IC is the Motorolla MC34262 (equivalently L6561D).

Another design consideration is the value of the common inductor 204, 304, which is used in both the boost and SEPIC converter topologies. The proper design of the common inductor 204, 304 is critical to properly centering the circuit operating frequency. The ideal inductance value $L_b$ (corresponding to each of inductors 204 and 304) for the boost converter operated at critical conduction mode is calculated using Equation 1 below:

$$L_b = \frac{V_{inLL}^2(V_o - \sqrt{2} \cdot V_{inLL})}{2 f_b P_o V_o} \qquad \text{Equation 1}$$

where:

$V_{inLL}$ is the low line input voltage $V_o$ is the DC output voltage $P_o$ is the output power $f_b$ is the switching frequency.

The ideal inductance value $L_s$ (coupled inductors 204 and 208, and coupled inductors 304 and 308) for the SEPIC converter operated at critical conduction mode is calculated using Equation 2 below:

$$L_S = \frac{(NV_0)^2}{P_0 f_S} \left[ \frac{\sqrt{2} \cdot V_{inHL}}{NV_0 + \sqrt{2} \cdot V_{inHL}} \right]^2 \qquad \text{Equation 2}$$

where:

$V_{inHL}$ is the high line input voltage $V_o$ is the DC output voltage

N is the isolation transformer 312 turns ration (N=1 for non-isolated Circuit of FIG. 2)

$f_s$ is the switching frequency.

Therefore, for a fixed inductance value (i.e. $L_b=L_s$), the switching frequency ratio $f_b/f_s$ is calculated by combining Equations 1 and 2 as shown in Equation 3 below:

$$\frac{f_b}{f_s} = \frac{V_{inLL}^2(V_o - \sqrt{2} \cdot V_{inLL})(NV_o + \sqrt{2} \cdot V_{inHL})^2}{4(NV_o)^2 V_{inHL}^2 V_o} \qquad \text{Equation 3}$$

From Equation 3 it can be appreciated that for the appropriate values of $V_o$, N, $V_{inLL}$, and $V_{inHL}$, the ratio $f_b/f_s$ will ideally approach 1. It therefore follows that an ideal switching frequency range may be implemented to accommodate both the boost and SEPIC circuit topologies.

The switching between the boost and SEPIC topologies therefore must depend on the input line voltage level. That is, for low line input voltages, such as 120VAC, the switch 200 must be conductive in position A to configure the converter as a boost converter circuit topology. Alternatively, for high line input voltages, such as 277 VAC, the switch must be conductive in position B to configure the converter as a SEPIC circuit topology. Similarly, for the switchable boost/isolated SEPIC converter of FIG. 3, switch 300 must be conductive, and switch 301 not conductive, at low line input voltages to form a boost converter topology. Switch 300 must not be conductive, and switch 301 conductive, for high line input voltages to form an isolated SEPIC topology.

An ordinarily skilled artisan will recognize there are many different ways to implement the topology switching function described above. The simplest implementation would be factory installed jumpers. Slightly more complicated implementations involving automatic switching schemes may also be employed. For example, an input voltage sensing circuit 220, 420 which controls a relay or solid state switch 200, 400, such as a thyristor, according to the input line voltage may be employed.

Another exemplary implementation utilizes a fuse 218, 318 in series with the inductor 208, 308 to sense the current passing therethrough. The fuse conducts current to the inductor 208, 308 from the DC bus initially, forming a SEPIC (or isolated SEPIC) converter. When the input line voltage is high, such as 277VAC, the fuse completes the circuit and the SEPIC converter configuration is properly formed. However, when a low line input voltage is introduced at the input, such as 120VAC, the current through the fuse is greater. After a given time period, the increased current will cause the fuse to stop conducting and disconnect the inductor 208, 308. This zero current condition in the inductor is then sensed to trigger a solid state switch or relay SW to establish the connection between inductor 204, 304 and diode 206, 306, respectively.

Yet another exemplary implementation utilizes the circuit switching frequency information. In this implementation, the circuit is again initially configured as a SEPIC (or isolated SEPIC) converter and includes a switching-frequency sensing circuit 219, 419. The switching frequency of the converter will vary with the input line voltage level. That is, when the input line voltage is high the switching frequency is higher than it is for low line input voltages. Accordingly, when the lower switching frequency is detected, control signals are initiated by the circuit 219, 419 to change the state of a solid state relay or switch, which thereby changes the configuration of the converter to a boost converter.

Referring now to FIG. 4, a switchable boost/flyback converter is illustrated. When switch 400 is conductive in position A, a boost converter topology is formed comprised primarily of power switch 402, inductor 404a and diode 406. When switch 400 is conductive in position B, a flyback converter comprised primarily of power switch 402, transformer 404 and diode 406, is formed.

In the switchable boost/flyback converter of FIG. 4, it is advantageous to configure the converter in a boost topology for low line input voltages, such as 120V. The boost converter offers greatly improved circuit efficiency. Alternatively, the converter must be configured in a flyback topology for high line input voltages such as 277 VAC, in order to obtain intermediate output voltages, such as 225 VDC, due to the output voltage limitations of the boost converter.

There are notable circuit design considerations when implementing the switchable boost/flyback power converter. The PFC control 425 may be realized using the MC34262 as discussed above with reference to the boost/SEPIC converter. Each converter topology is preferably operated in a critical conduction mode, with high frequency switching under the ZVS condition.

Another design consideration is the value of the common inductor 404a (of transformer 404). The proper design of inductor 404a is critical to properly centering the circuit operating frequency. The ideal inductance value $L_f$ (inductor 404a) for the flyback converter operated at critical conduction mode is calculated using Equation 4 below:

$$L_f = \frac{(\sqrt{2}\, V_{inHL} N V_o)^2}{P_o f_k (N V_o + \sqrt{2}\, V_{inHL})^2} \quad \text{Equation 4}$$

where:

N is the transformer 404 turns ratio $f_k$ is the switching frequency.

The ideal inductance $L_s$ for the boost converter is calculated using Equation 1 above, where $L_s$ corresponds to the inductance of inductor 404a.

Therefore, for a fixed inductance value, (i.e. $L_f = L_s$), the switching frequency ratio $f_b/f_k$ is calculated by combining Equations 1 and 4 as shown in Equation 5 below:

$$\frac{f_b}{f_k} = \frac{V_{inLL}^2 (V_o - \sqrt{2}\, V_{inLL})(N V_o + \sqrt{2}\, V_{inHL})^2}{4 (N V_o)^2 V_{inHL}^2 V_o} \quad \text{Equation 5}$$

The switching function may be implemented using the techniques discussed above with respect to the switchable boost/SEPIC converter.

Accordingly, by using a switchable power converter, the most efficient power converter circuit for wide input and/or output range applications is realized. By using the best characteristics of each converter type and combining them in a suitable configuration, circuit efficiency is greatly improved over the single topology circuits, such as the flyback and SEPIC converter.

An ordinarily skilled artisan will recognize that the present invention also encompasses many variations to the exemplary embodiments detailed above. For example, the switching functions of the present invention may be realized using resources shared with, for instance, the power stage components and/or control circuitry to thereby minimize cost and increase compactness. In addition, while the switching actions and number of switches are limited in the exemplary embodiments detailed above, the present invention may include any number of switches/switching actions. Any number of components may be added or removed from the circuit topology in accordance with the switches/switching actions.

In addition, the converter section may be operated using various conduction modes and is not limited to only critical conduction mode. For example, the converter section may also operate in continuous conduction mode, discontinuous conduction mode, and/or any combination of the three modes.

Further, while the exemplary embodiments described above illustratively utilize low line and high line input voltages of 120V/277V AC, respectively, to produce an intermediate DC output voltage of 225V, the circuit components, circuit topology and switching frequency characteristics may be selected as needed to accompany other operating voltages, such as 120V/240V AC input voltages.

While the present invention has been described in detail with reference to the preferred embodiments, they represent mere exemplary applications. Thus, it is to be clearly understood that many variations can be made by anyone having ordinary skill in the art while staying within the scope and spirit of the present invention as defined by the appended claims.

What is claimed is:

1. A switchable power converter, comprising:

an input section that receives an AC (alternating current) input voltage and rectifies the AC input voltage; and a switchable converter section operative to receive the rectified AC input voltage and convert the rectified AC input voltage to an intermediate DC output voltage;

said switchable converter section including at least one configuration switch operative to switch the switchable converter section between a boost converter topology and a SEPIC (single-ended primary inductance converter) topology according to a voltage level of the AC input voltage.

2. The switchable power converter of claim 1, wherein the switchable converter section comprises:

a power bus including a first inductor, a capacitor and a diode connected in series, said power bus receiving the rectified AC input voltage via the first inductor and outputting the intermediate DC output voltage via the diode;

a power switch connected between a return path and a junction between the capacitor and the first inductor;

a second inductor, magnetically coupled with the first inductor, connected between the return path and a first terminal of the at least one configuration switch;

a second terminal of the at least one configuration switch connected to the junction between the capacitor and first inductor;

a third terminal of the at least one configuration switch connected to a junction between the capacitor and diode; and a power switch control circuit to control a power switching of the power switch in accordance with the voltage level of the AC input voltage; thereby maintaining the intermediate DC output voltage;

wherein when the at least one configuration switch is conductive only between the first and third terminals, the switchable converter is operative using the SEPIC converter topology and when the configuration switch is conductive only between the second and third terminals, the switchable converter section is operative using the BOOST topology.

3. The switchable power converter of claim 2, wherein the first inductor's inductance value $L_b$ is calculated using the following equation:

$$L_b = \frac{V_{inLL}^2(V_o - \sqrt{2} \cdot V_{inLL})}{2f_b P_o V_o}$$

where:
- $V_{inLL}$ is a low line AC input voltage,
- $V_o$ is the DC output voltage,
- $P_o$ is an output power, and
- $f_b$ is a switching frequency of the switchable power converter.

4. The switchable power converter of claim 2, wherein the at least one configuration switch comprises:
- a fuse connected between the first and third terminals, said fuse operative to stop conducting when a current through the second inductor corresponds to said AC input voltage being approximately 120VAC, and
- an electrically controlled switch interposed between the second and third terminals, said electronic switch operative to sense the current through the second inductor and being conductive only when the current through the second inductor is approximately zero.

5. The switchable power converter of claim 1, wherein the switchable converter section comprises:
- a power bus including a first inductor and a capacitor connected in series, said power bus receiving the rectified AC input voltage via the first inductor, and the capacitor connected to a second terminal of the at least one configuration switch;
- a power switch connected between a return path and a junction between the capacitor and the first inductor;
- a second inductor, magnetically coupled with the first inductor, connected between the return path and a first terminal of the at least one configuration switch;
- a third terminal of the at least one configuration switch connected to the junction between the capacitor and first inductor;
- a transformer having a primary coil connected in parallel to the second inductor and a secondary coil connected between a diode and a return path;
- a fourth terminal of the at least one configuration switch connected to a junction between the secondary coil of the transformer and the diode; and
- a power switch control circuit to control a power switching of the power switch in accordance with the voltage level of the AC input voltage; thereby maintaining the intermediate DC output voltage;
  - wherein when the at least one configuration switch is conductive only between the third and fourth terminals, the switchable converter is operative using the boost converter topology and when the configuration switch is conductive only between the first and second terminals, the switchable converter section is operative using an isolated SEPIC topology.

6. The switchable power converter of claim 5, wherein the at least one configuration switch comprises:
- a fuse connected between the first and second terminals, said fuse operative to stop conducting when a current through the second inductor corresponds to said AC input voltage being approximately 120VAC, and
- an electrically controlled switch interposed between the third and fourth terminals, said electronic switch operative to sense the current through the second inductor and being conductive only when the current through the second inductor is approximately zero.

7. The switchable power converter of claim 5, wherein a total inductance value $L_s$ of the first and second inductors, the second inductor being coupled to the first, is calculated using the following equation:

$$L_S = \frac{(NV_0)^2}{P_0 f_S} \left[ \frac{\sqrt{2} \cdot V_{inHL}}{NV_0 + \sqrt{2} \cdot V_{inHL}} \right]^2$$

where:
- $V_{inHL}$ is a high line AC input voltage,
- $V_o$ is the DC output voltage,
- N is a turns ratio for the transformer, and
- $f_s$ is a switching frequency of the switchable power converter.

8. The switchable power converter of claim 1, wherein the at least one configuration switch comprises continuity jumpers.

9. The switchable power converter of claim 1, wherein the at least one configuration switch is comprised of an input voltage sensing circuit and an electrically controlled switch, said input voltage sensing circuit sensing a voltage level of the AC input voltage and controlling the electrically controlled switch according to said voltage level.

10. The switchable power converter of claim 1, wherein when the AC input voltage level is approximately 120VAC, the at least one configuration switch is operative to switch the switchable converter section to a boost converter topology and when the AC input voltage is approximately 277VAC, the at least one configuration switch is operative to switch the switchable converter section to a SEPIC topology.

11. The switchable power converter of claim 1, wherein when the AC input voltage level is approximately 120VAC, the at least one configuration switch is operative to switch the switchable converter section to a boost converter topology and when the AC input voltage is approximately 240VAC, the at least one configuration switch is operative to switch the switchable converter section to a SEPIC topology.

12. The switchable power converter of claim 1, wherein the at least one configuration switch comprises a switching frequency sensing circuit, and an electrically controlled switch, said switching frequency sensing circuit sensing a switching frequency of the switchable power converter and controlling the electrically controlled switch according to said switching frequency, the switching frequency varying according to the AC input voltage.

13. A switchable power converter, comprising:
- an input section that receives an AC input voltage and rectifies the AC input voltage; and
- a switchable converter section operative to receive the rectified AC input voltage and convert the rectified AC input voltage to an intermediate DC output voltage;
- said switchable converter section including at least one configuration switch operative to switch the switchable converter section between a boost converter topology and a flyback converter topology according to a voltage level of the AC input voltage.

14. The switchable power converter of claim 13, wherein the switchable converter section comprises:
- a power bus including a first inductor, the at least one configuration switch and a diode connected in series, said power bus receiving the rectified AC input voltage via the first inductor, and the first inductor and diode connected to a first and second terminal, respectively, of the at least one configuration switch;
- a power switch connected between a return path and the first terminal;

a second inductor, magnetically coupled with the first inductor to form a transformer, connected between the return path and a third terminal of the at least one configuration switch; and a power switch control circuit to control a power switching of the power switch in accordance with the voltage level of the AC input voltage; thereby maintaining the intermediate DC output voltage;

wherein when the at least one configuration switch is conductive only between the first and second terminals, the switchable converter is operative using the boost converter topology and when the configuration switch is conductive only between the second and third terminals, the switchable converter section is operative using a flyback converter topology.

15. The switchable power converter of claim 14, wherein the first inductor's inductance value $L_f$ is calculated using the following equation:

$$L_f = \frac{(\sqrt{2}\, V_{inHL} N V_o)^2}{P_o(f_k(NV_o + \sqrt{2}\, V_{inHL}))^2}$$

where:
$V_{inHL}$ is a high line AC input voltage,
$V_o$ is the DC output voltage,
N is a turns ratio of the transformer, and
$f_k$ is a switching frequency of the switchable power converter.

16. The switchable power converter of claim 13, wherein when the AC input voltage level is approximately 120VAC, the at least one configuration switch is operative to switch the switchable converter section to a boost converter topology and when the AC input voltage is approximately 240VAC, the at least one configuration switch is operative to switch the switchable converter section to a flyback converter topology.

17. The switchable power converter of claim 13, wherein when the AC input voltage level is approximately 120VAC, the at least one configuration switch is operative to switch the switchable converter section to a boost converter topology and when the AC input voltage is approximately 277VAC, the at least one configuration switch is operative to switch the switchable converter section to a flyback converter topology.

18. The switchable power converter of claim 13, wherein the at least one configuration switch comprises continuity jumpers.

19. The switchable power converter of claim 13, wherein the at least one configuration switch comprises an input voltage sensing circuit and an electrically controlled switch, said input voltage sensing circuit sensing a voltage level of the AC input voltage and controlling the electrically controlled switch according to said voltage level.

20. The switchable power converter of claim 13, wherein the at least one configuration switch comprises a switching frequency sensing circuit, and an electrically controlled switch, said switching frequency sensing circuit sensing a switching frequency of the switchable power converter and controlling the electrically controlled switch according to said switching frequency, the switching frequency varying according to the AC input voltage.

* * * * *

UNITED STATES PATENT AND TRADEMARK OFFICE
CERTIFICATE OF CORRECTION

PATENT NO. : 6,373,725 B1  Page 1 of 1
DATED : April 16, 2002
INVENTOR(S) : Chang et al.

Figure 2A:
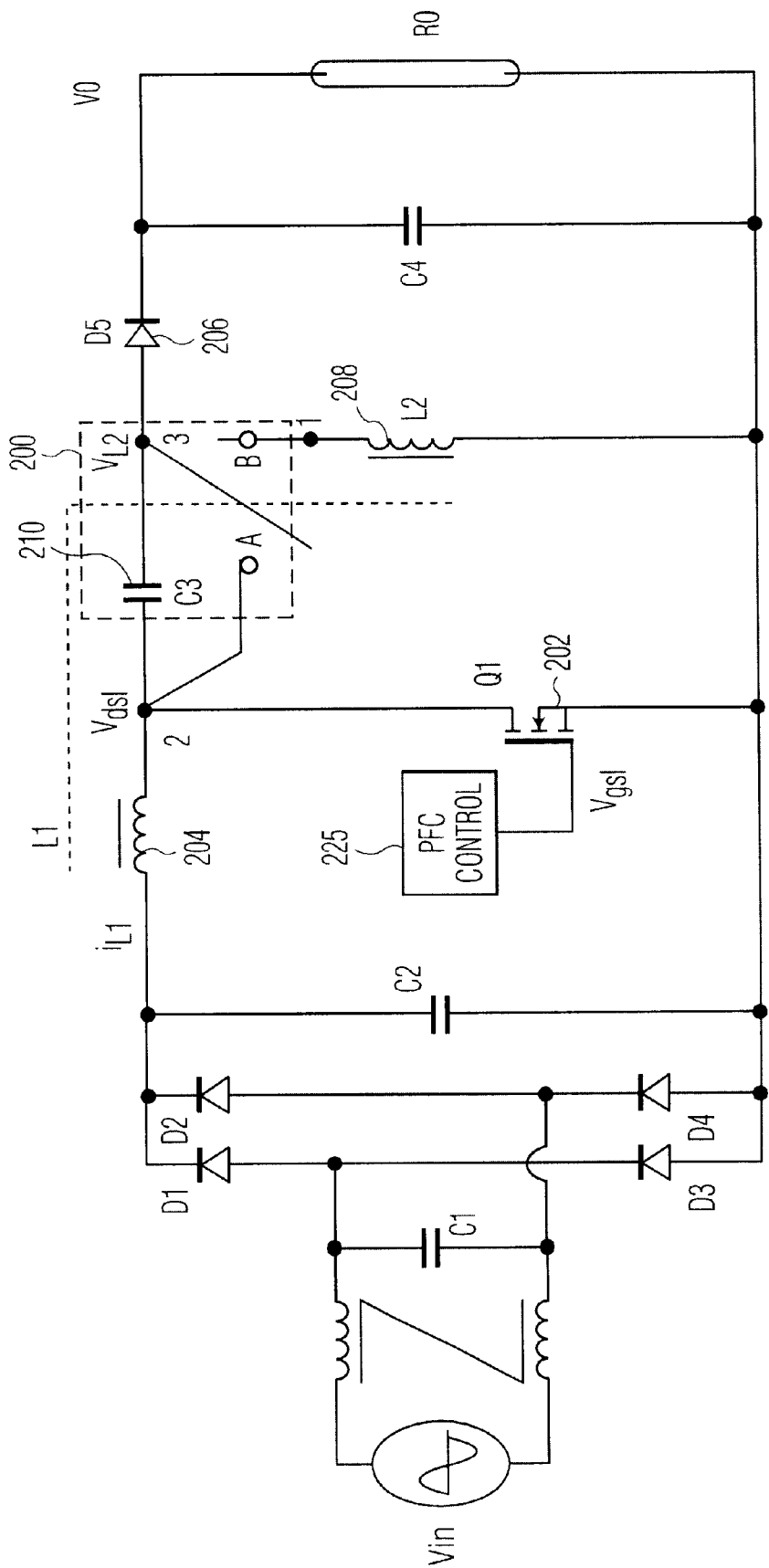
FIGS. 2A–2D are schematic diagrams illustrating a switchable boost/SEPIC power converter in accordance with the present invention.

It is certified that error appears in the above-identified patent and that said Letters Patent is hereby corrected as shown below:

Column 2,
Line 50, change "FIG. 2" to -- FIG. 2A --.
Line 58, change "FIG. 3" to -- FIG. 3A --.

Figure 2B:
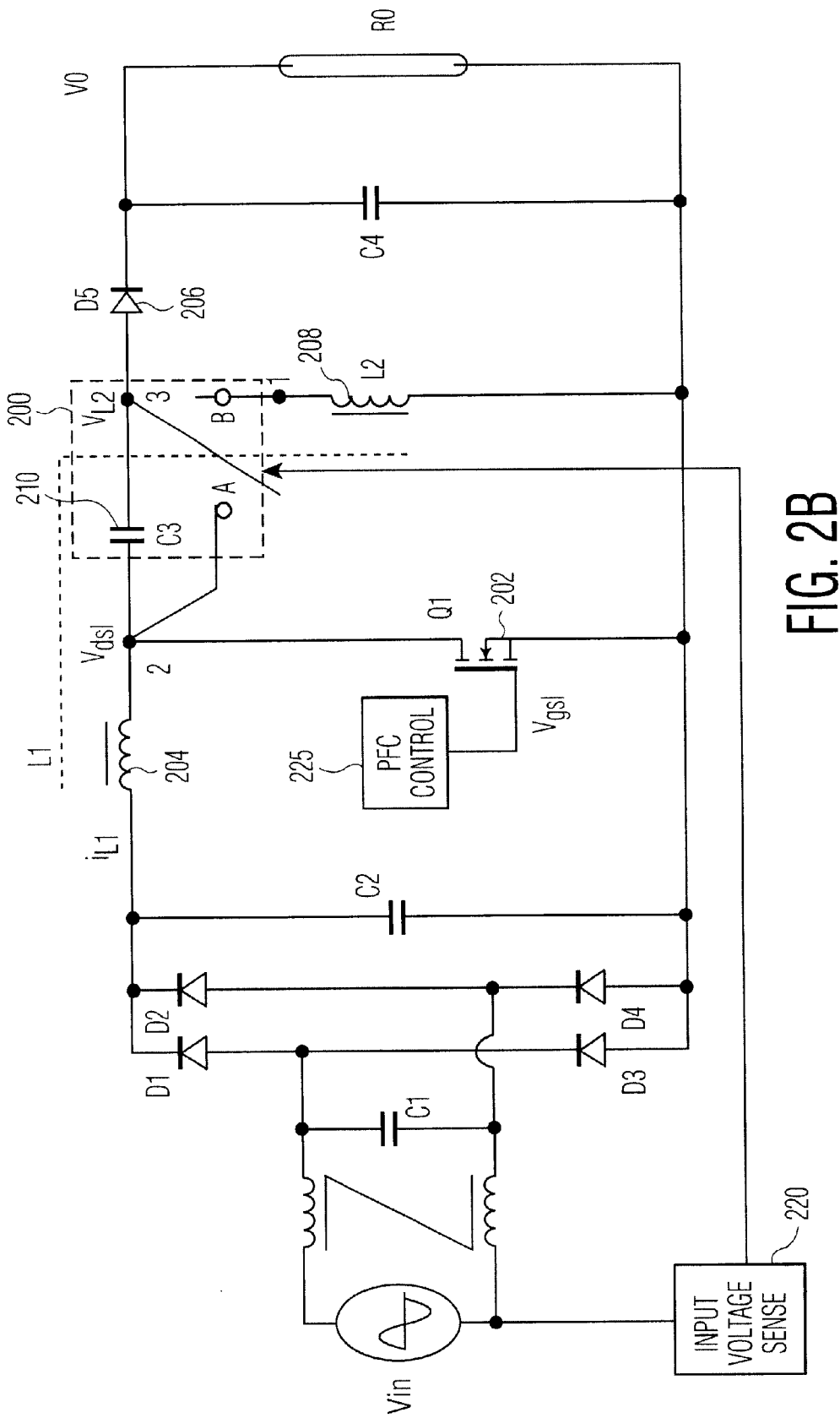
Figure 2C:
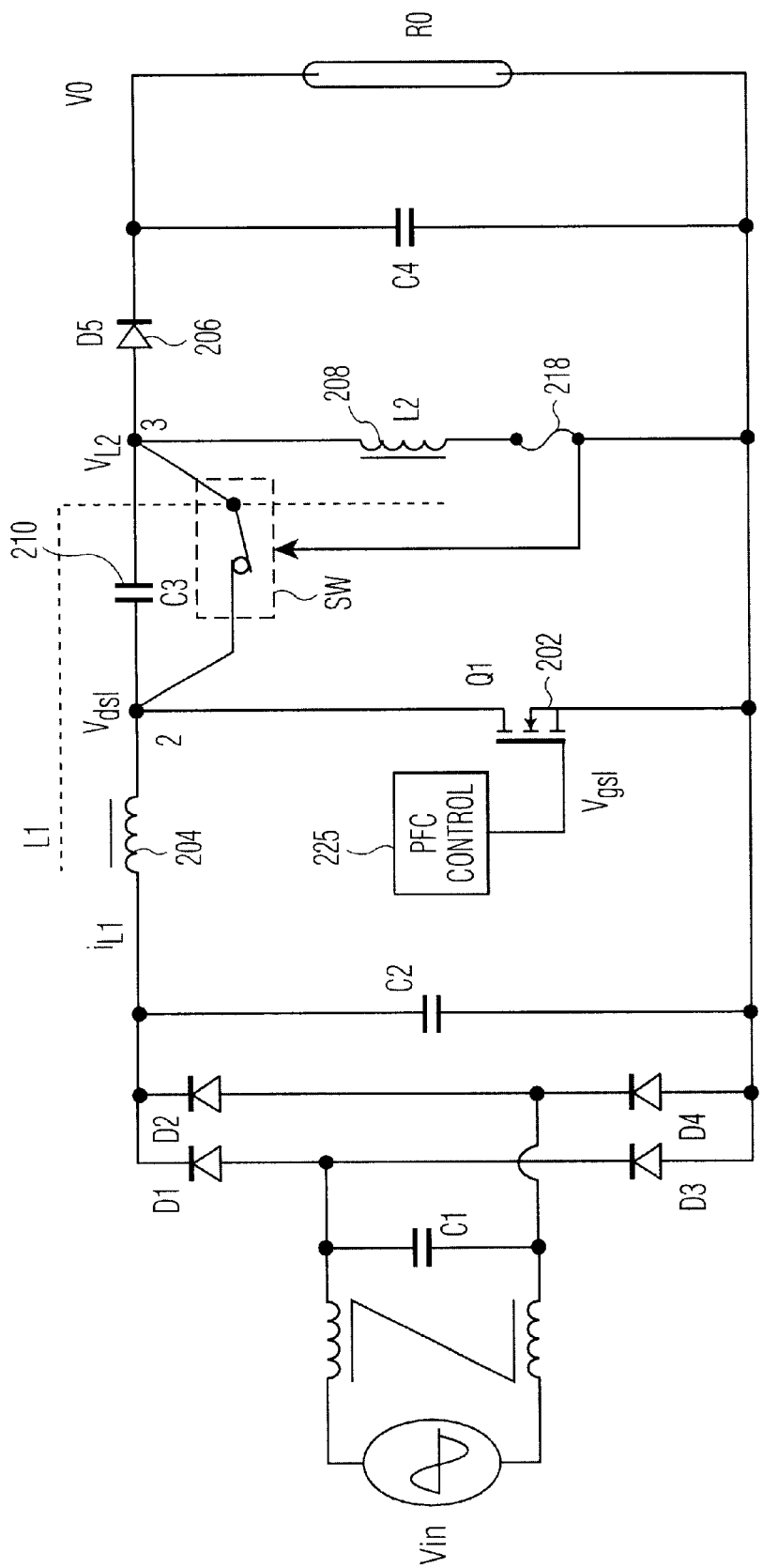
Figure 2D:
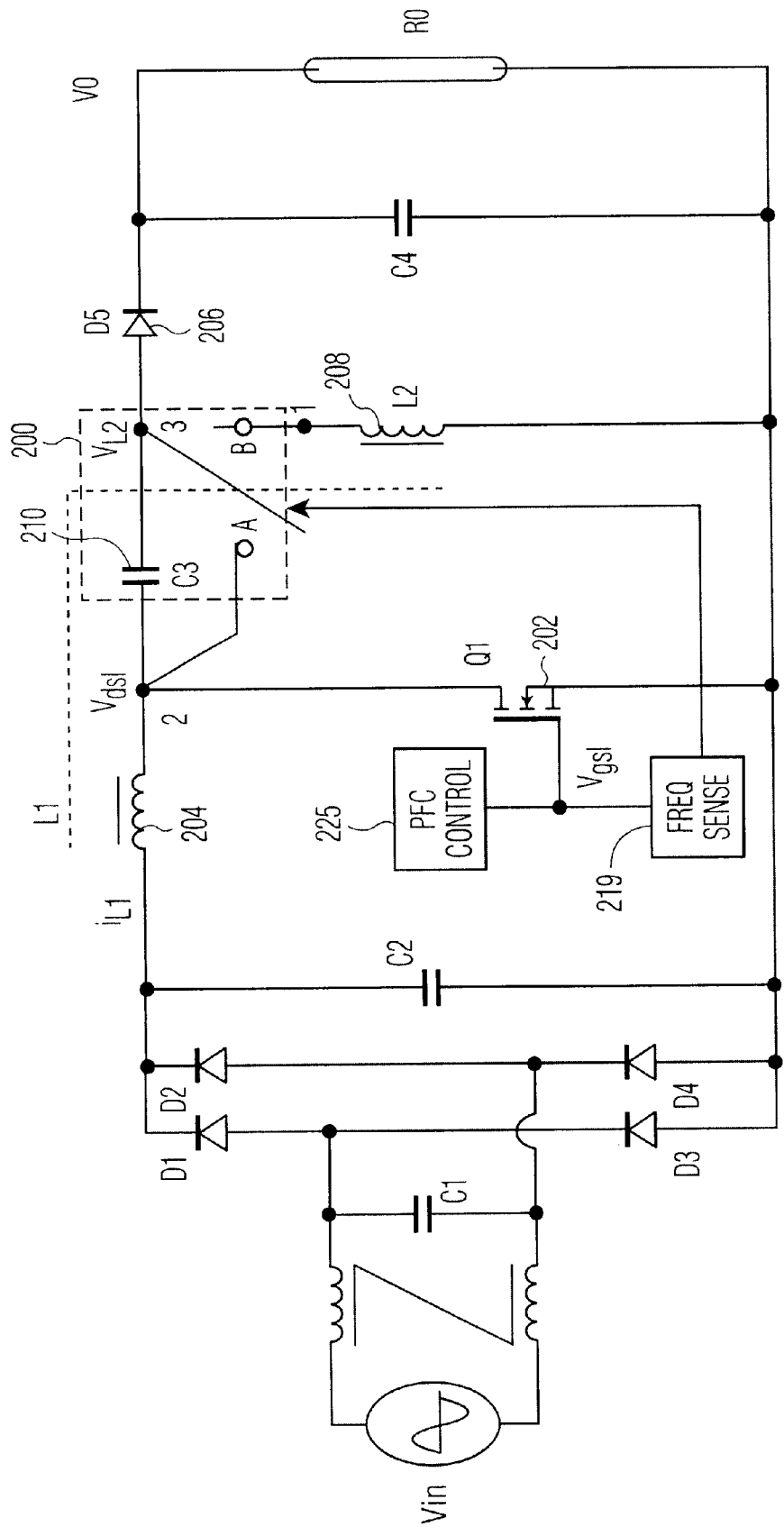
Figure 3A:
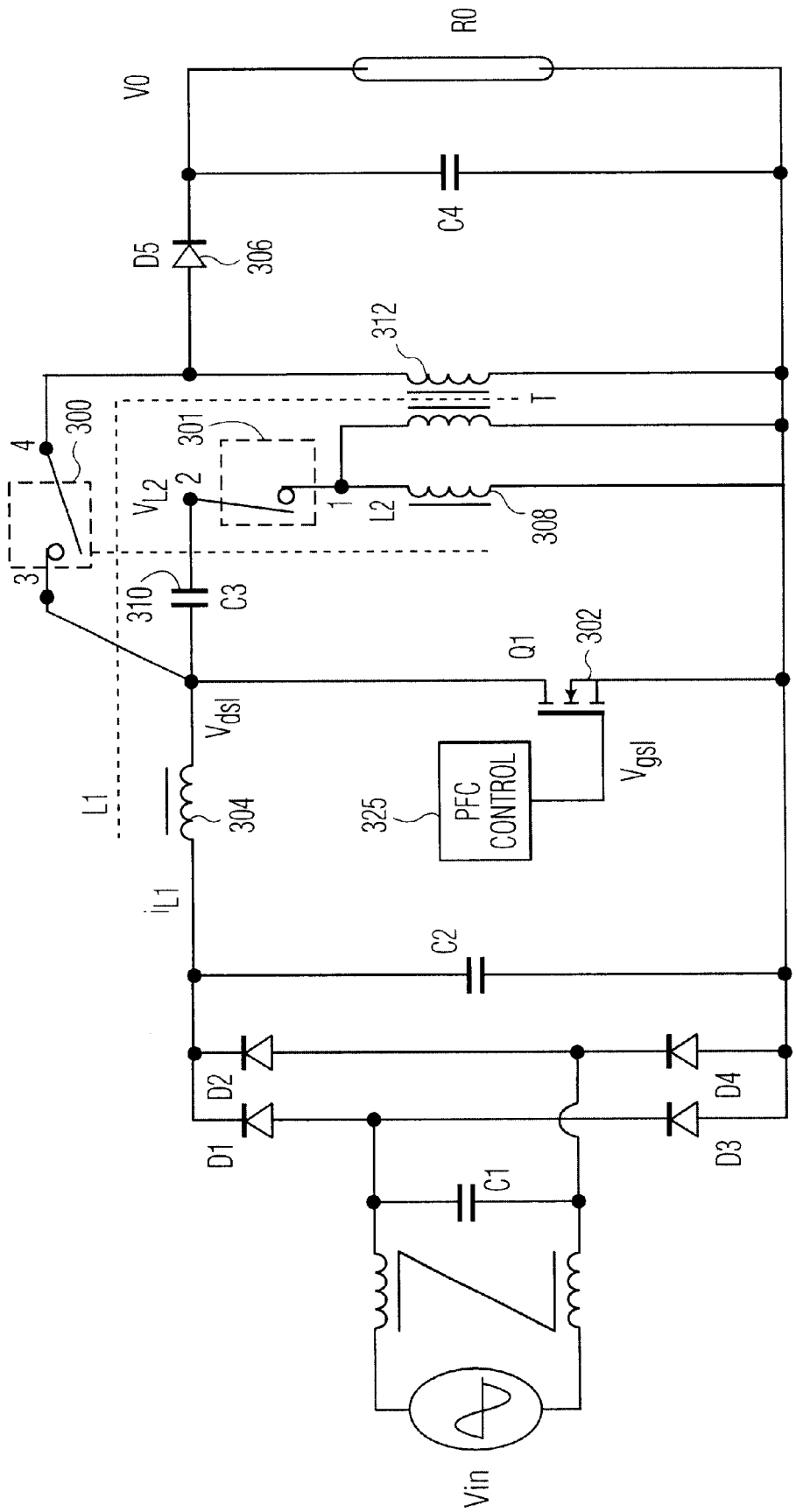
FIGS. 3A and 3B are schematic diagrams illustrating a switchable boost/isolated SEPIC power converter in accordance with the present invention.

Column 3,
Line 2, change "FIGS. 2 and 3" to -- FIGS. 2A and 3A --.
Line 3, change "FIG. 3" to -- FIG. 3A --.
Line 7, change "FIGS. 2 and 3" to -- FIGS. 2A and 3A --.
Line 62, change "FIG. 2" to -- FIG. 2A --.

Figure 3B:
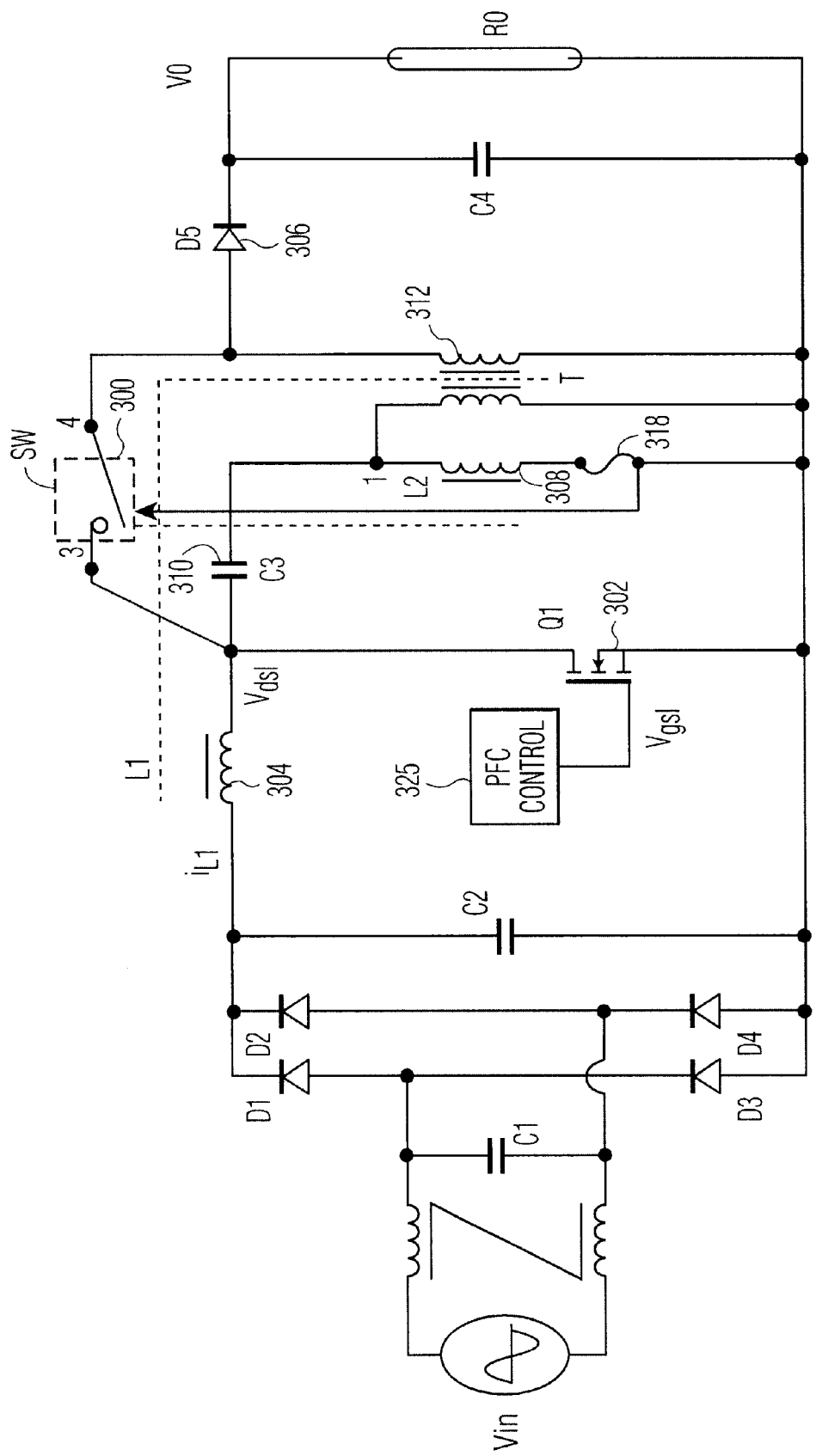

Column 4,
Line 18, change "FIG. 3" to -- FIG. 3A --.
Line 29, after "For example," insert -- as shown in Figs. 2B and 4B, respectively, --.
Line 33, after "implementation", insert -- shown in Figs. 2C and 3B --.
Line 49, after "implementation", insert -- shown in Figs. 2D and 4C, --.
Line 61, change "FIG. 4" to -- FIG. 4A --.

Figure 4A:
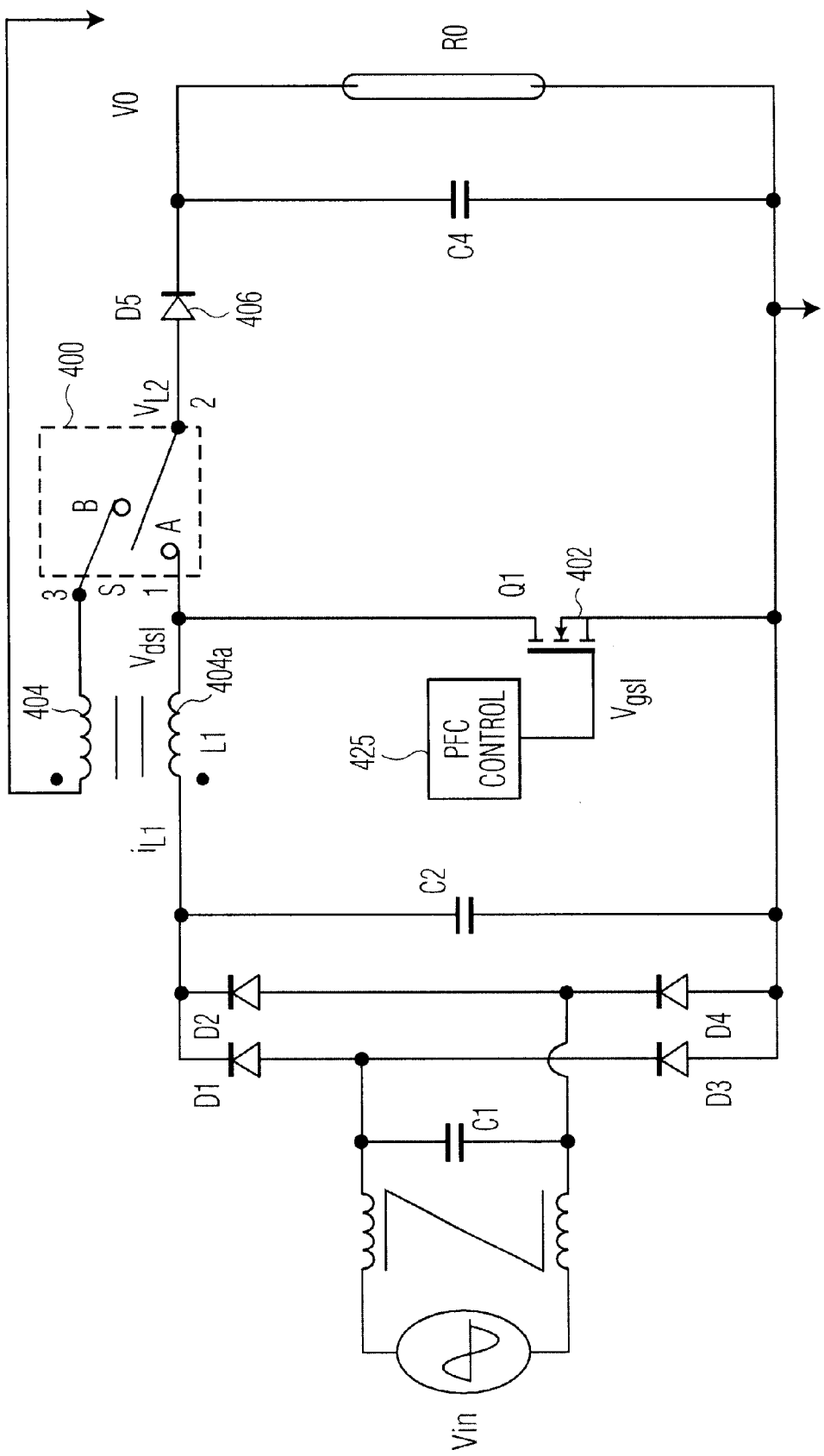
FIG. 4A–4C are schematic diagrams illustrating a switchable boost/flyback power converter in accordance with the present invention.
Figure 4B:
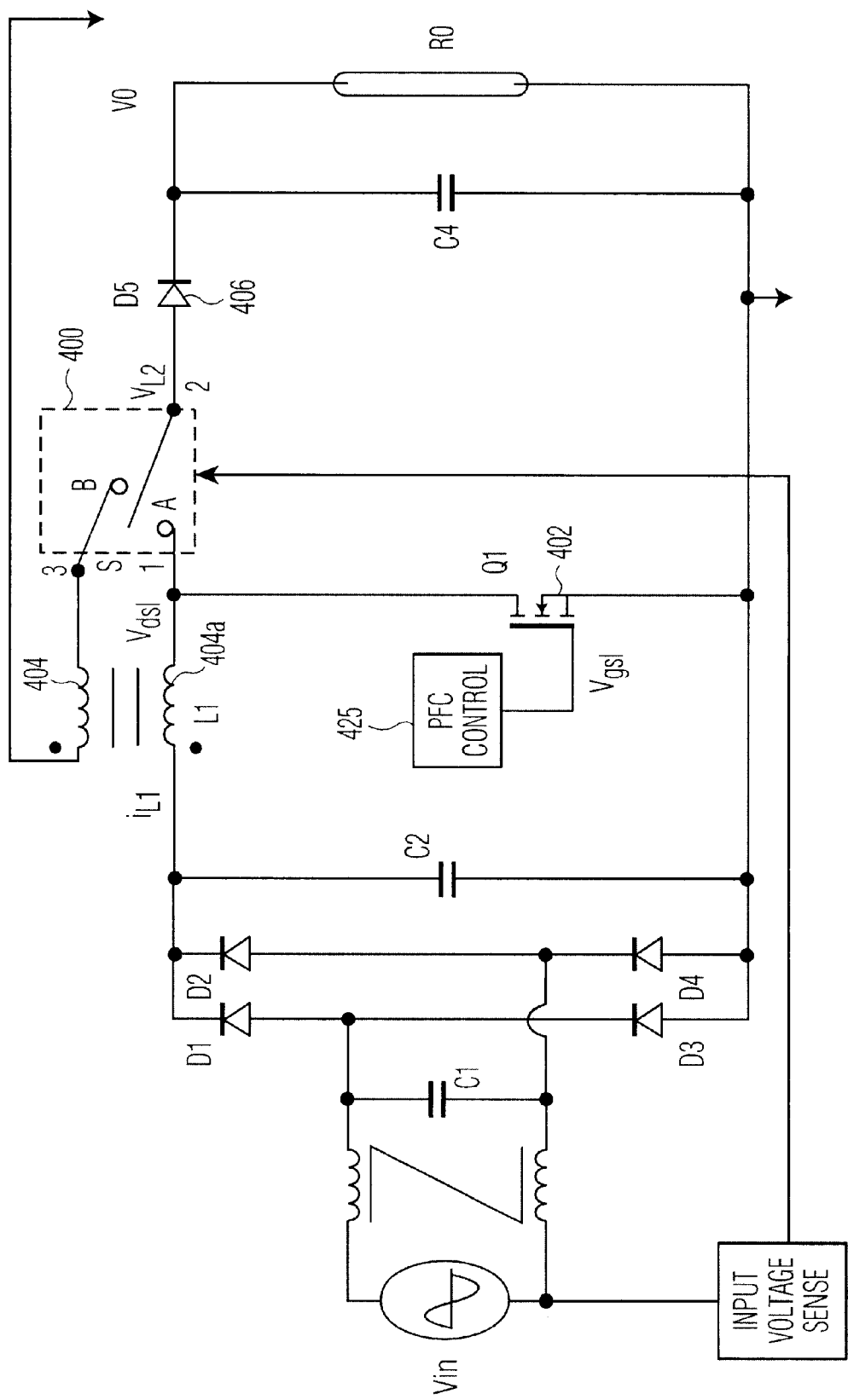
Figure 4C:
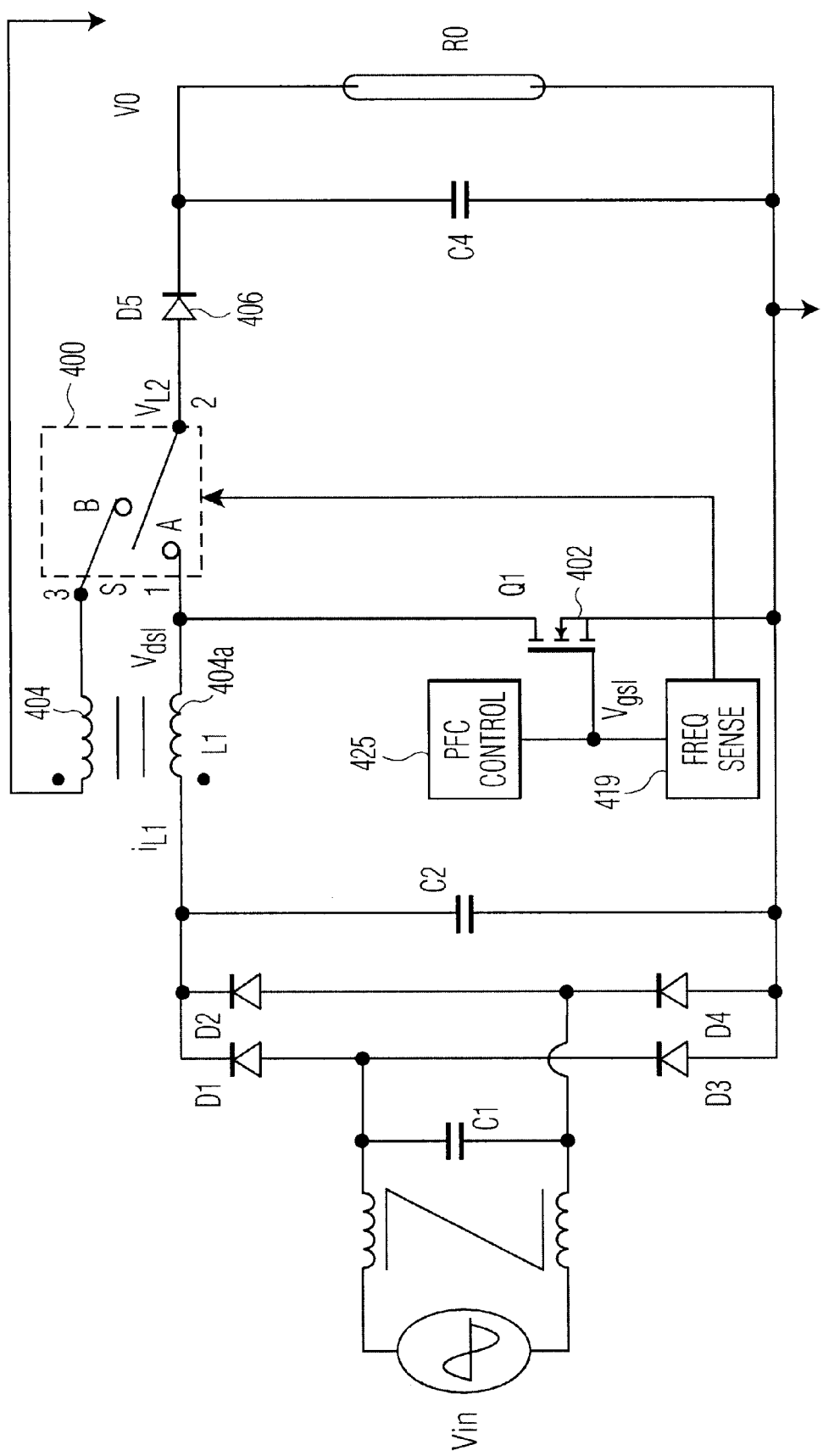

Column 5,
Line 1, change "FIG. 4" to -- FIG. 4A --.

Column 7,
Line 15, after "a fuse" insert -- electrically --.
Line 15, after "connected" insert -- in series with the second inductor --.
Line 15, delete "between the first and third terminals".
Line 59, after "a fuse" insert -- electronically --.
Line 59, after "connected" insert -- in series with the second inductor --.
Line 59, delete "between the first and second terminals".

Signed and Sealed this

Sixth Day of April, 2004

JON W. DUDAS
*Acting Director of the United States Patent and Trademark Office*